United States Patent [19]

Secondi

[11] Patent Number: 5,800,114
[45] Date of Patent: Sep. 1, 1998

[54] CONTAINER HANDLING DEVICE

[75] Inventor: Jean Paul Secondi, Saint Chamond, France

[73] Assignee: Hydro 7 International, Saint Etienne, France

[21] Appl. No.: 648,028

[22] PCT Filed: Nov. 15, 1994

[86] PCT No.: PCT/FR94/01331

§ 371 Date: May 14, 1996

§ 102(e) Date: May 14, 1996

[87] PCT Pub. No.: WO95/13983

PCT Pub. Date: May 26, 1995

[30] Foreign Application Priority Data

Nov. 16, 1993 [FR] France ............... 93 13957

[51] Int. Cl.⁶ ............... B66F 3/36; B66F 3/46
[52] U.S. Cl. ............... 414/458; 414/498; 410/82; 280/43.23
[58] Field of Search ............... 414/458, 498; 280/33.991, 43.23, 404; 212/344, 326; 254/89 R, 89 H; 410/82, 83

[56] References Cited

U.S. PATENT DOCUMENTS

| | | | |
|---|---|---|---|
| 3,289,868 | 12/1966 | Miller et al. | 414/498 X |
| 3,570,694 | 3/1971 | Tantlinger | 280/43.23 X |
| 3,749,363 | 7/1973 | Hauser | 414/498 X |
| 3,795,336 | 3/1974 | Acker et al. | 280/43.23 X |
| 4,190,135 | 2/1980 | Wenzel et al. | 254/89 R X |
| 4,231,709 | 11/1980 | Corsetti | 414/458 |
| 4,516,901 | 5/1985 | Riedl | 414/458 |
| 4,570,959 | 2/1986 | Grinwald | 414/458 X |
| 4,863,334 | 9/1989 | Girerd | 414/458 |
| 4,961,680 | 10/1990 | Riedl et al. | 414/458 |
| 5,006,031 | 4/1991 | Fossing et al. | 414/458 |

FOREIGN PATENT DOCUMENTS

| | | | |
|---|---|---|---|
| 0564118 | 9/1958 | Canada | 254/89 H |
| 2 252 277 | 6/1975 | France . | |
| 2369202 | 6/1978 | France | 414/458 |
| 35 37 640 | 4/1987 | Germany . | |
| 88 06 335 | 7/1988 | Germany . | |
| 1311985 | 5/1987 | U.S.S.R. | 414/458 |
| WO 88/04276 | 6/1988 | WIPO . | |
| WO 93/21100 | 10/1993 | WIPO . | |

*Primary Examiner*—James W. Keenan
*Attorney, Agent, or Firm*—Oliff & Berridge PLC

[57] ABSTRACT

A container handling device includes four lifting assemblies that can couple to the lower corner of a container. The device has a rolling subframe with a hydraulic cylinder interposed between the subframe and the portion of the assemblies that couple with the container. The device also has an electro-hydraulic set and an electric-power-supply and control unit common to all four lifting assemblies. The frame is fastened to the central member of a yoke that is in the form of a "C", and has a height less than that of the container. The yoke includes, at a lower end, a horizontal angle bracket suitable for going around the external angle of the lower corner of a container and, at its upper end, a horizontal angle bracket capable of going around the corner upright of the container. The portion that couples to the lower corner of the container is included on one of the flanges of the lower horizontal angle bracket. The other flange includes, projecting from an inner face, a stationary positioning tenon.

9 Claims, 4 Drawing Sheets

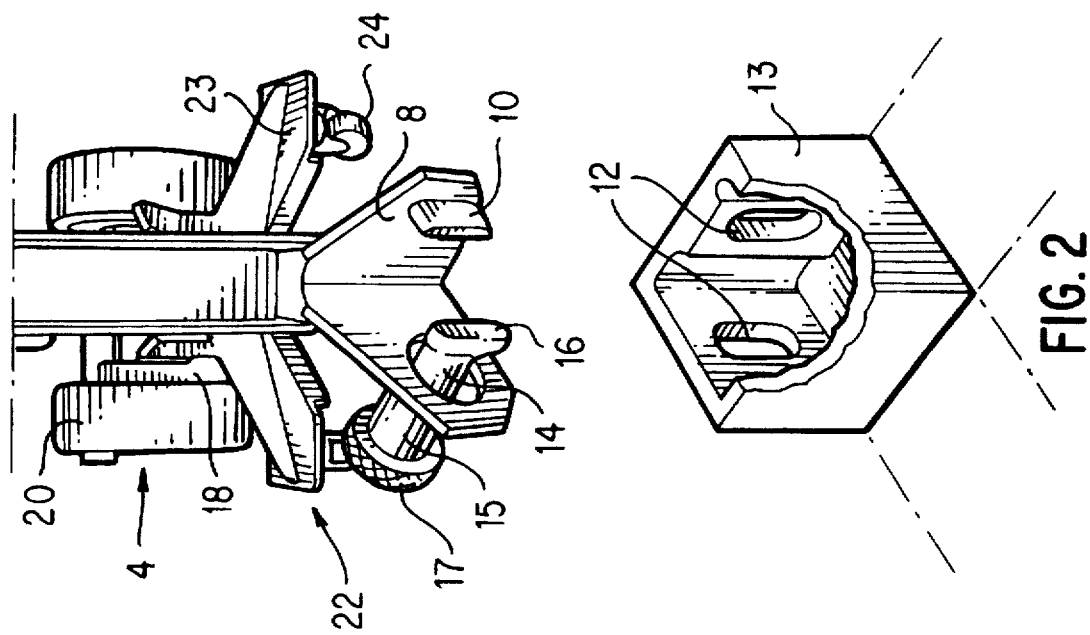
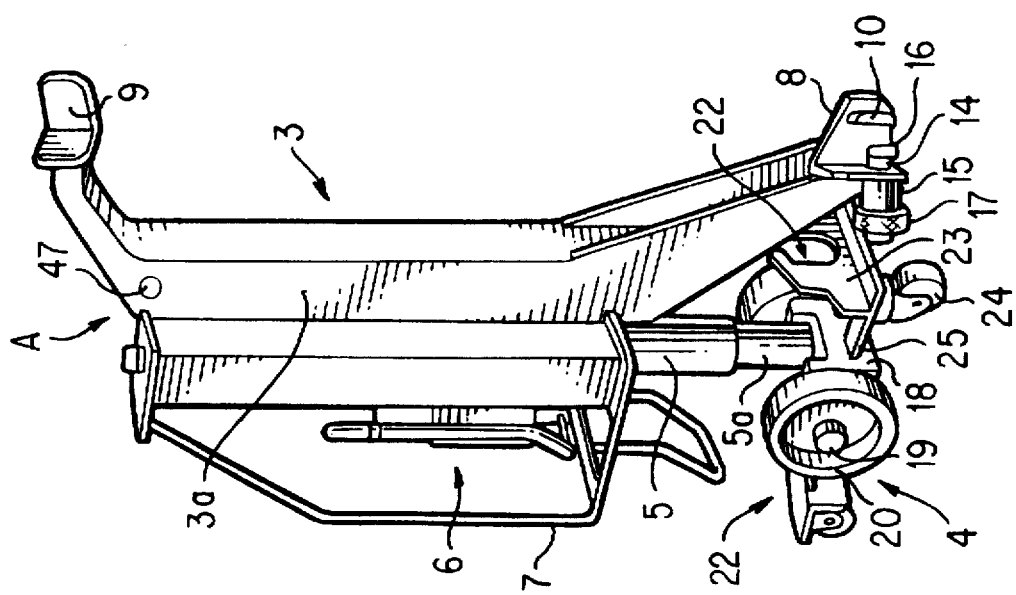
FIG. 2
FIG. 1

CONTAINER HANDLING DEVICE

BACKGROUND OF THE INVENTION

1. Field of the Invention

The invention relates to the field of handling standardized containers used for transporting various merchandise and having a height and a width of the order of 2.4 m and a length of the order of 6 m or 12 m.

2. Description of Related Art

Although handling in transshipment areas does not pose any particular problem since handling is provided by suitable gantry-shaped trucks which can straddle a container and can lift it, for example in order to deposit it on another container, handling in non-equipped areas is much more difficult since it requires the use of a lifting machine, such as a crane, the hourly hiring cost of which is high.

The same is true for loading and unloading a vehicle assigned to transporting such containers, for the movement of a container within one place of use, for example between an unloading area, a holding area and a loading area, and, more simply, in order to stack a container on another container.

In order to overcome this, it has already been imagined to produce handling devices composed of vertical support feet which are fixed to the end faces of a container and including mechanical lifting means, such as cables, cable pulleys, ratchet and winch. Fixing these means to the container, installing stabilizing means between support feet and manipulating the mechanical lifting means entails a lengthy handling operation requiring a sizeable crew.

A lifting device is also known, from WO 88/04276, which includes four assemblies each equipped with a subframe having rolling means, with a structure which can move vertically with respect to the subframe by means of a hydraulic cylinder supplied by an electrohydraulic structure controlled by an independent control cabinet, and with respectively upper and lower coupling means interacting with the corners of the corresponding corner upright of the container.

Since the rolling means of each assembly are arranged halfway along the movable structure and since each assembly is used vertically, its vertical erection close to the corresponding upright of the container requires either several men or lifting means. Moreover, the positioning of the upper coupling means requires human intervention, lengthening the preparation time and being dangerous as this is carried out 4 meters from the ground when the container is on the platform of a lorry.

A handling device is also known, from FR-A-2,252,277, which comprises four independent assemblies each composed of a truck carrying a vertical hydraulic cylinder supplied by a manual pump and of a support structure interacting with an intermediate component attached to the lower corner of the corresponding upright of the container.

In order to instal this device against the container, as well as to operate it, it is necessary to have several people available, leading to high operating expenses. Moreover, because of its structure, this device has a small lifting travel which limits its application to manoeuvring a container between the platform of a vehicle and a bay substantially level with this platform.

SUMMARY OF THE INVENTION

The object of the present invention is to overcome these drawbacks by providing a handling device for containers and other boxes including standardized corners, which is autonomous, simple and quick to operate, requiring only a single person, while at the same time being less expensive, both in terms of purchasing cost and operating cost, than the current means.

For this purpose, in each lifting assembly, one of the elements of the hydraulic cylinder is fastened to a frame carrying the electrohydraulic set and itself fastened to the central member of a yoke which is in the form of a "C" in the vertical plane and has a height less than that of the container, this yoke possessing, at its lower end, a horizontal angle bracket capable of going around the external angle of the lower corner of a container and, at its upper end, a horizontal angle bracket capable of going around the corner upright of the container, whereas the means of coupling to the lower corner of the container are carried by one of the flanges of the lower angle bracket, the other flange of which carries, projecting from its inner face, a stationary positioning tenon capable of passing through the opening (12) made in a corner (13) of a container and of bearing on the upper edge of this opening, each assembly being installed by bringing the longitudinal mid-plane of this assembly into the vertical plane containing the bisector of the corresponding vertical angle of the container and by moving the angle brackets up against this angle.

Each assembly may be easily moved by a single person in order to come close to one of the angles of the container and in the mid-plane of this angle. In this position, its lower horizontal angle bracket may be easily positioned against the lower corner of the container by means of its positioning tenon associated with this corner. It will be noted that the positioning of the lower angle bracket against the corner brings the upper angle bracket against the upright of the container so that the assembly is positioned easily, in a shorter time and without having to climb up on the container.

When all the assemblies are positioned and coupled to the lower corners of the container, their electrohydraulic sets are connected to the supply unit from which a single operator can control the running of these electrohydraulic sets and the supply of the cylinders causing the vertical movement of the yokes with respect to the subframe of each assembly.

By means of the coupling of each yoke to the lower corner of the container, each assembly is rigidly coupled to this container and therefore requires no additional rigidifying means. This reduces the cost of the device and shortens the time to fit it to a container.

In one embodiment of the invention, the means of coupling each assembly to one of the corners of the container comprise, projecting from the inner face of the flange of the lower angle bracket not carrying the stationary tenon, a movable tenon which, including a "T"-shaped end capable of bearing against the inner face of the corner after having passed through the oblong opening therein, is mounted so as to slide in a sheath and interacts, by means of a threaded part, with a threaded ring which is mounted so as to rotate freely in the sheath but prevented from moving translationally with respect to it.

As soon as the angle bracket is pressed up against the dihedron formed by the corner, the threaded ring is actuated so as to move the movable tenon longitudinally until its "T"-shaped end comes into contact with the inner face of the corner and forms a clamping jaw, complementary to the jaw formed by the flange of the angle bracket. This simple and effective fixing means is very easy to use, both in the clamping direction and in the unclamping direction.

Advantageously, the power-supply and control unit is carried by a chassis which includes four vertical uprights and the base of which is equipped with corners for containers, the uprights and corners being capable of interacting with the angle brackets of the four lifting assemblies in order to form a storable and transportable monolithic assembly.

This arrangement makes it easy to move and to store the device, and also to operate it, by a single person, since each lifting element always maintains a vertical position and does not require large forces to be unfastened from the chassis and moved.

BRIEF DESCRIPTION OF THE DRAWINGS

Other characteristics and advantages will emerge from the description which follows, with reference to the appended diagrammatic drawing, depicting by way of non-limiting example an embodiment of the device according to the invention.

FIG. 1 is a view, in perspective, of one of the assemblies of which this device is composed;

FIG. 2 is a partial view, in perspective, showing, on a large scale, the lower part of an assembly as it is being installed against the lower corner of a container;

DETAILED DESCRIPTION OF PREFERRED EMBODIMENTS

Figure 4:
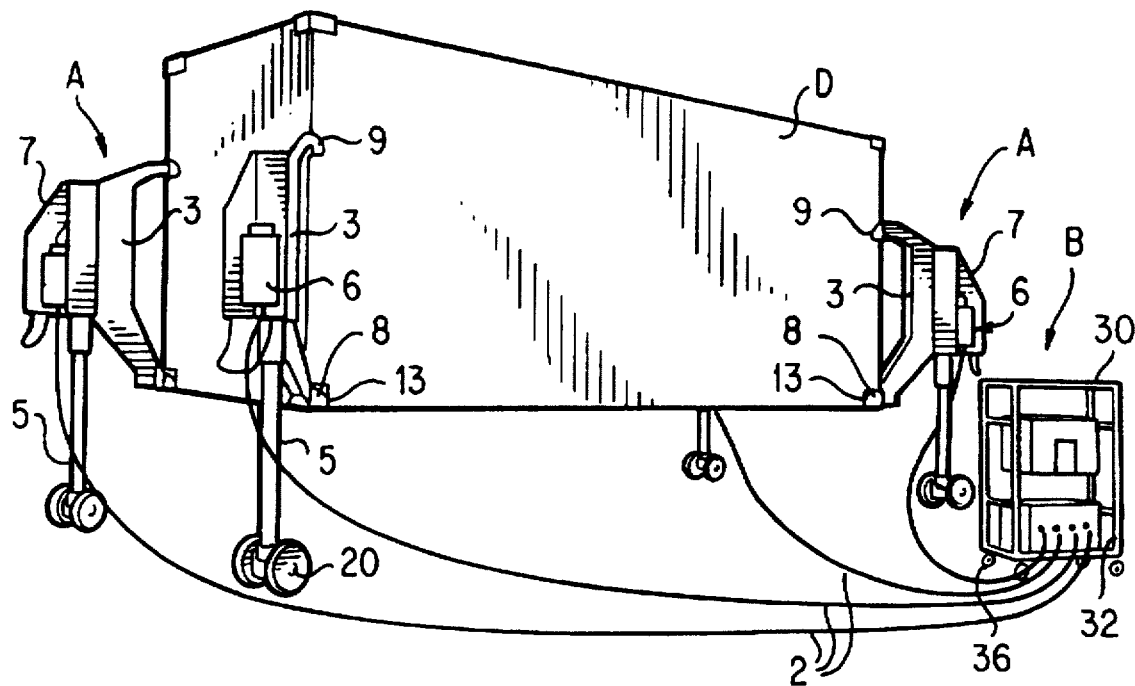
FIG. 4 is a view, in perspective, showing the entire device when it is in a position for lifting a container.
Figure 5:
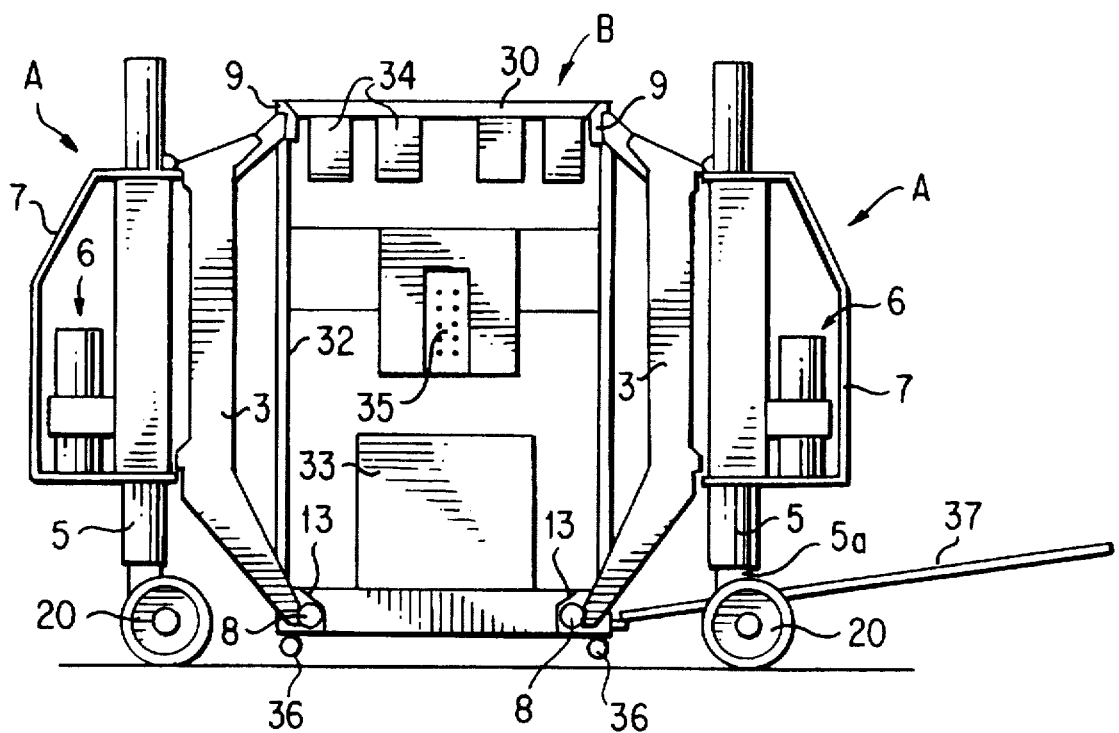
FIG. 5 is a side view, in elevation, showing the device when it is in the storage position and combined with a chassis carrying the supply unit.
Figure 6:
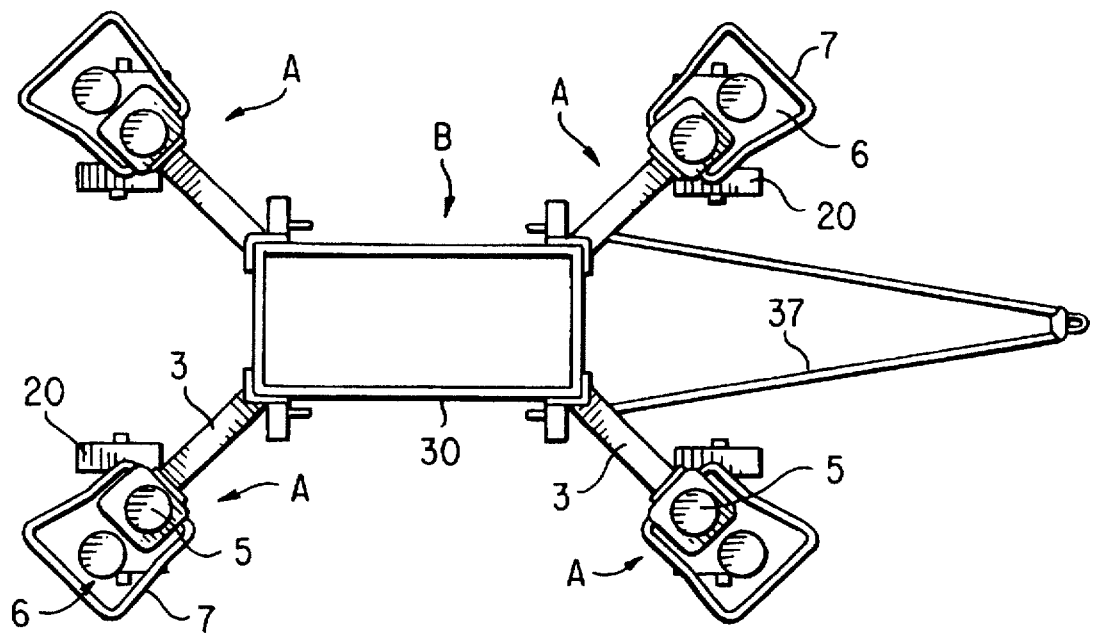
FIG. 6 is a plan view, from above, of the device of FIG. 5.

As FIG. 4 shows, the device according to the invention is composed of four lifting assemblies designated by the reference A. Each assembly is linked via an electrical cable 2 to a common supply unit B.

Figure 3:
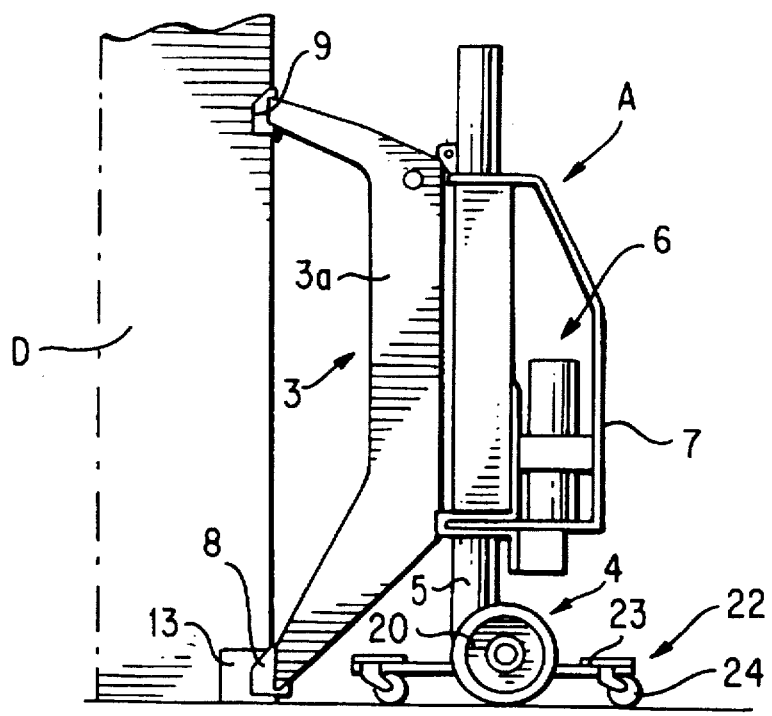
FIG. 3 is a side view, in elevation, showing, on a reduced scale, an assembly when it is pressed up against one of the angles of a container.

As FIGS. 1 to 3 show, each lifting assembly A is composed of a yoke 3 which is in the form of a vertical "C" and has a height less than that of the upright of a container, of a rolling subframe 4, of a hydraulic cylinder 5, interposed between the subframe 4 and the yoke 3, and of an electrohydraulic set 6 carried by a frame 7 fastened to the central member 3a of the yoke 3.

Each of the ends of the yoke 3 is equipped with a horizontal angle bracket, respectively a lower angle bracket 8 and an upper angle bracket 9. As is shown in more detail in FIG. 2, the lower angle bracket includes, projecting from the inner face of one of its flanges, a stationary positioning tenon 10 capable of penetrating into one of the oblong openings 12 in one of the corners 13, these openings being made in the lower part of each container and in alignment with the corner uprights. The other flange of the same angle bracket carries a means of coupling to the other oblong hole 12 of the same corner 13.

In the embodiment depicted, this coupling means is composed of a tenon 14, which can move axially in a sheath 15 fastened to the angle bracket 8. The free end of the tenon 14 is equipped with a transverse bar 16 giving it the shape of a "T", whereas its other end is threaded and interacts with a ring 17, which is mounted so as to rotate freely with respect to the sheath 15 but prevents it from moving translationally with respect to the latter.

The rolling subframe 4 is composed of a "U"-shaped support 18, the central member of which is coupled to one of the elements of the hydraulic cylinder 5 and the vertical flanges of which are each equipped with a horizontal pivot 19 for a wheel 20.

In the embodiment depicted, the "U"-shaped support 18 is coupled to the telescopic rod 5a of the cylinder 5, the body of which is fixed to the back of the central member 3a of the yoke. This coupling enables the support 18 of the subframe to pivot about a vertical axis.

In order to stabilize each assembly, when it is not coupled to a container, each rolling subframe is associated with at least one, and very often with two, removable dollies 22. Each dolly is composed of a chassis 23 carrying two castors 24 which can swivel about a vertical axis and two hitching bars 25. These bars, which are parallel and horizontal, are capable of penetrating into fixing sheaths made in the support 18 of the rolling subframe. In practice, each bar is fixed in the corresponding sheath by means of a transverse bolt which is screwed into the central member of the support 18 and comes into contact with the corresponding hitching bar via one of its ends, this bolt including an operating head, at its other end, protruding from the central member.

The electrohydraulic set 6 carried by the frame 7 comprises, in a known manner, an electric motor driving a hydraulic pump delivering, through a three-position solenoid valve, into one of the two branches of a hydraulic circuit for supplying the body of the cylinder 5. The hydraulic set is autonomous, that is to say the frame 7 carries the oil reservoir and the accessories necessary for operating this set.

It will be noted that, by means of this arrangement, each lifting assembly is hydraulically independent of the others and that it is linked to the other assemblies only via electrical links 2 terminating in the control unit B.

In the embodiment depicted in FIGS. 1 to 6, the control unit B is carried by a chassis 30, of rectangular cross-section, the four vertical uprights 32 of which are equipped, at their base, with standardized corners 13 identical to those arranged at the four lower angles of each container. Moreover, the height of this frame is at least equal to the height of the yoke 3 of each assembly so that each of the assemblies can be connected to it, in order to be stored for example.

This chassis carries an electric-power-generating set 33 with its operating and control means, but also means for storing the electrical links and especially four reels 34 for each of the four cables 2 connecting this control unit to the four assemblies. It also carries a control box 35 having push-buttons making it possible to control, simultaneously or separately, the supply of the cylinders 5 of the lifting assemblies A. This box may be of the traditional type or be formed by a high-frequency or infrared remote-control.

The chassis 30 is advantageously equipped with means, not depicted, enabling the removable dollies 22 to be carried when they are not themselves fixed to the rolling subframe of each assembly. Finally, it is equipped with castors 36, enabling it to move along the ground when it is not raised up by the assemblies, and with a removable litter 37 enabling it to be moved by a towing vehicle.

A container D is handled by means of this device in the following manner. Each assembly, equipped beforehand with at least one dolly 22, is unfastened from the frame 30 of the control unit B by actuating the tenon 14 by means of the threaded ring 17. It is brought close to one of the corners of a container, positioned so that its longitudinal mid-plane contains the bisector of the angle of the upright, and then is moved up to this angle until the positioning tenon 10 of its lower angle bracket 8 is near one of the oblong openings 12 in the corresponding lower corner 13. At this stage, it is moved so that its angle bracket 8 goes around the external angle of the corner 13 and comes into contact with this corner, whereas the angle bracket 9 comes into contact with the upright arranged in the vertical extension of this corner, as shown in FIG. 3. In order finally to couple the assembly to the container, it suffices to engage the "T"-shaped part 16 of the movable tenon 14 in the other hole 12 and to actuate the ring 17 so as to grip the wall of this corner between the end 16 and the corresponding flange of the angle bracket 8.

When all the assemblies are fastened to one of the angles of the container, their removable dollies 22 are removed and the assemblies are connected via the cables 2 to the operating and control unit B.

It will be noted that these various operations may be performed by a single person and in a time much shorter than that required with the known devices.

At this stage, in order to lift the container, it suffices, after having switched on the electrohydraulic sets 6 of each lifting assembly A, to actuate the buttons of the control box 35 in order to initiate the movements of the cylinders 5, by actuating their solenoid valve for delivery.

The lifting travel may thus be adjusted as desired, depending on the requirements. In practice, each of the cylinders 5 is chosen to be able to lift a container D, laid on the ground, by an amount equal to the distance from the ground of the platform of a vehicle, to which is added a clearance, that is to say of the order of 1.7 meters so as to enable this container to be deposited on this platform or on any support.

FIG. 4 shows that a container raised by the device can easily be moved and towed by means of the wheels 20 equipping each assembly A.

After completing the operations for handling the container and when the latter has been laid down, the removable dollies 22 are reinstalled on the subframes 4, the yokes 3 are unfastened from the container D and brought back to their lower initial position.

This handling device enables any container equipped with standardized corners to be moved vertically and horizontally for a cost which is several times less than that with a container-handling truck. When it is in the storage position, it forms an assembly which can be easily transported, thereby enabling it to be brought to work sites, to unloading areas or to storage areas. The operation is simple and quick and requires no special training, like, incidentally, in order to operate and control it. Consequently, this device may be operated by non-specialized personnel, without any risk to the personnel and to the articles being transported.

Figure 7:
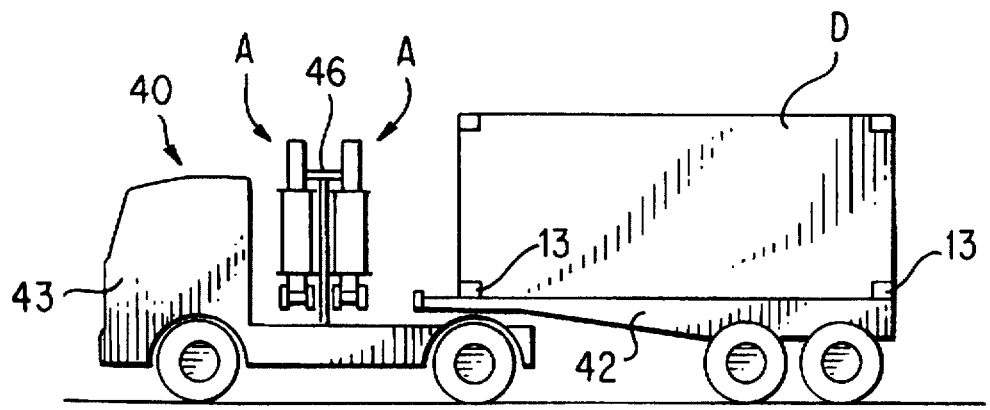
FIGS. 7 and 8 are views, in elevation, respectively from the side and from the rear, showing the incorporation of the device according to the invention into the towing vehicle of a road-going combine for transporting a container.
Figure 8:
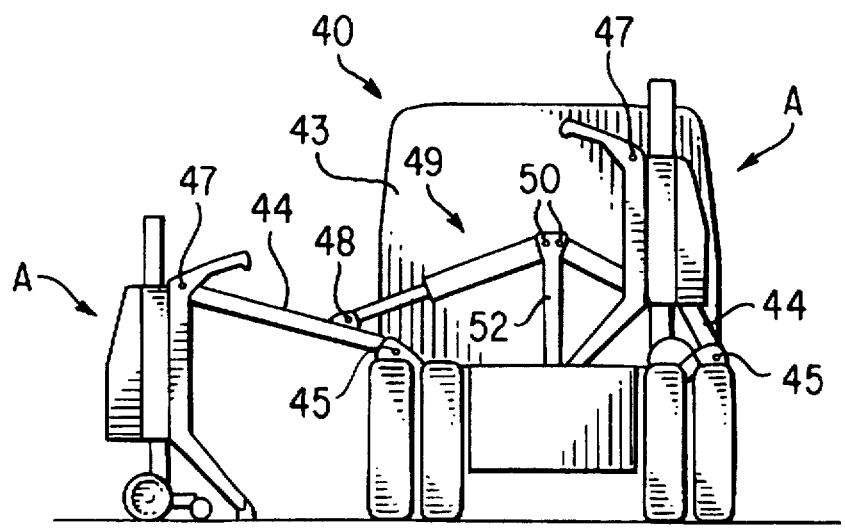

FIGS. 7 to 8 show that the device according to the invention may be incorporated into the towing vehicle 40 of a road-going combine, the semitrailer 42 of which is used for transporting containers D. Under these conditions, the supply and control unit is incorporated into the towing vehicle 40 and the lifting assemblies A are arranged laterally and in pairs behind the cabin 43 of the towing vehicle 40.

In the embodiment depicted, each pair of lifting assemblies A is associated with an operating arm 44 capable of bringing it from a storage position behind the cabin and the towing vehicle, as shown in the right-hand part of FIG. 8, to a working position shown on the left-hand part of the same figure, in which it bears on the ground and is arranged laterally on one side of the road-going combine.

Each manipulating arm 44 is articulated via one of its ends about a horizontal pin 45, swivelling in a clevis on the chassis of the towing vehicle. Its other end is fastened to a longitudinal member 46, seen in FIG. 7, each of the ends of which is articulated by means of an articulation 47 to the upper part of the yoke of each of the two juxtaposed assemblies. Each arm 44 is hitched via a horizontal articulation 48 to one of the elements of a hydraulic cylinder 49, the other element of which is articulated at 50 to a support 52 on the chassis.

In this application, when the vehicle arrives at a destination, its driver may very easily control, by means of the hydraulic cylinder 49, the operation of depositing the lifting assemblies, placed behind the towing vehicle, on the ground and then, after having unfastened each assembly A from the manipulating arm 44 carrying it, bring each assembly close to the angles of the container C carried by the vehicle. After connecting the electrical links between each assembly and the control unit carried by the towing vehicle, the same operator actuates the raising of the yokes, positions them and fixes them to the corners, and then raises the container with respect to the platform of the trailer 42. As soon as the container is raised by a sufficient amount, it suffices to move the road-going combine in order to enable the container to be laid on the ground, unless it has been brought above a suitable support by taking advantage of the wheels 20 of the rolling subframe 4 equipping each assembly.

Of course, after completing the handling, each assembly is brought back close to its handling arm in order to be able to be brought into the storage position at the rear of the towing vehicle.

It will be noted, in this application, that the device according to the invention helps the driver and, by shortening the time in which the trailer is occupied by a container, enables the road-going combine to be released more rapidly, thereby enabling a greater number of transport runs to be made in a day.

I claim:

1. A device for handling a container used for transporting items, the container being equipped with standardized upper and lower corners with the lower corners each having at least two openings, the device comprising:

four lifting assemblies; and an electric-power-supply and control unit common to the four lifting assemblies;

wherein each of the four lifting assemblies includes a "C"-shaped yoke having a central member, a subframe having rolling means, a hydraulic cylinder interposed between the subframe and yoke, a frame fastened to the central member of the yoke and an electrohydraulic set having a motor for driving the hydraulic cylinder, wherein the yoke has a height less than that of the container and includes, at a lower end, a first horizontal angle bracket for engaging the standardized lower corners of the container, the first horizontal angle bracket including a first flange and a second flange, the first flange having means for coupling the first horizontal angle bracket to one of the at least two openings of the standardized lower corners and, at an upper end, a second horizontal angle bracket capable of engaging the standardized upper corners of the container, and the second flange includes a stationary positioning tenon projecting from an inner face of the second flange, the stationary positioning tenon being capable of passing through another of the at least two openings of the standardized lower corners of the container and of bearing on an upper edge of the opening.

2. The device according to claim 1, wherein the means for coupling the first horizontal angle bracket of each lifting assembly comprises, projecting from an inner face of the first flange, a movable tenon having a "T"-shaped end capable of bearing against an inner face of the one of the at least two openings of the standardized lower corners of the container after having penetrated the one of the at least two openings of the standardized lower corners, wherein the movable tenon is slidably mounted in a sheath and threadably interacts with a threaded ring rotatably mounted in the sheath but not capable of moving translationally with respect to the sheath.

3. The device according to claim 1, wherein each subframe is rotatably mounted about a vertical axis of its corresponding hydraulic cylinder, and includes two horizontal pivots for two wheels, and means for fixing the subframe to hitching bars of at least one removable dolly, the at least one removable dolly adapted to stabilize each lifting assembly when the lifting assemblies are not connected to the container.

4. The device according to claim 3, wherein the subframe includes fixing sheaths and the at least one removable dolly includes a chassis including two castors and two horizontal, parallel hitching bars capable of penetrating into the fixing sheaths.

5. The device according to claim 1, wherein the electric power supply and control unit is positioned on a chassis that includes four vertical uprights and a base including standardized corners corresponding to the upper and lower standardized corners of the containers, wherein the vertical uprights and the standardized corners are capable of interacting with the first and second horizontal angle brackets of the four lifting assemblies to form a storable and transportable assembly.

6. The device according to claim 1, wherein the electric power supply and control unit is adapted for mounting on a road-going vehicle that includes two opposed arms, each arm capable of manipulating a pair of lifting assemblies between a storage position behind a cabin of the road-going vehicle, and a working position on the ground, laterally on one side of the road-going vehicle.

7. The device according to claim 6, wherein each arm is adapted to articulate about a first end thereof to the chassis of the road-going vehicle and includes, at a second end, a longitudinal member including ends adapted to couple in an articulated manner to the yokes of two lifting assemblies.

8. The device according to claim 1, wherein the electric power supply and control unit is connected to each of the four lifting assemblies with an electrical cable.

9. The device according to claim 1, wherein a longitudinal mid-plane of each lifting assembly is brought into a vertical plane containing a bisector of a corresponding vertical angle of the container such that the first and second horizontal angle brackets of each lifting assembly engage the corresponding vertical angle of the container.

* * * * *